No. 735,829. PATENTED AUG. 11, 1903.
J. F. D. SCHRADER.
MAPPING INSTRUMENT.
APPLICATION FILED JULY 8, 1902.
NO MODEL. 3 SHEETS—SHEET 2.

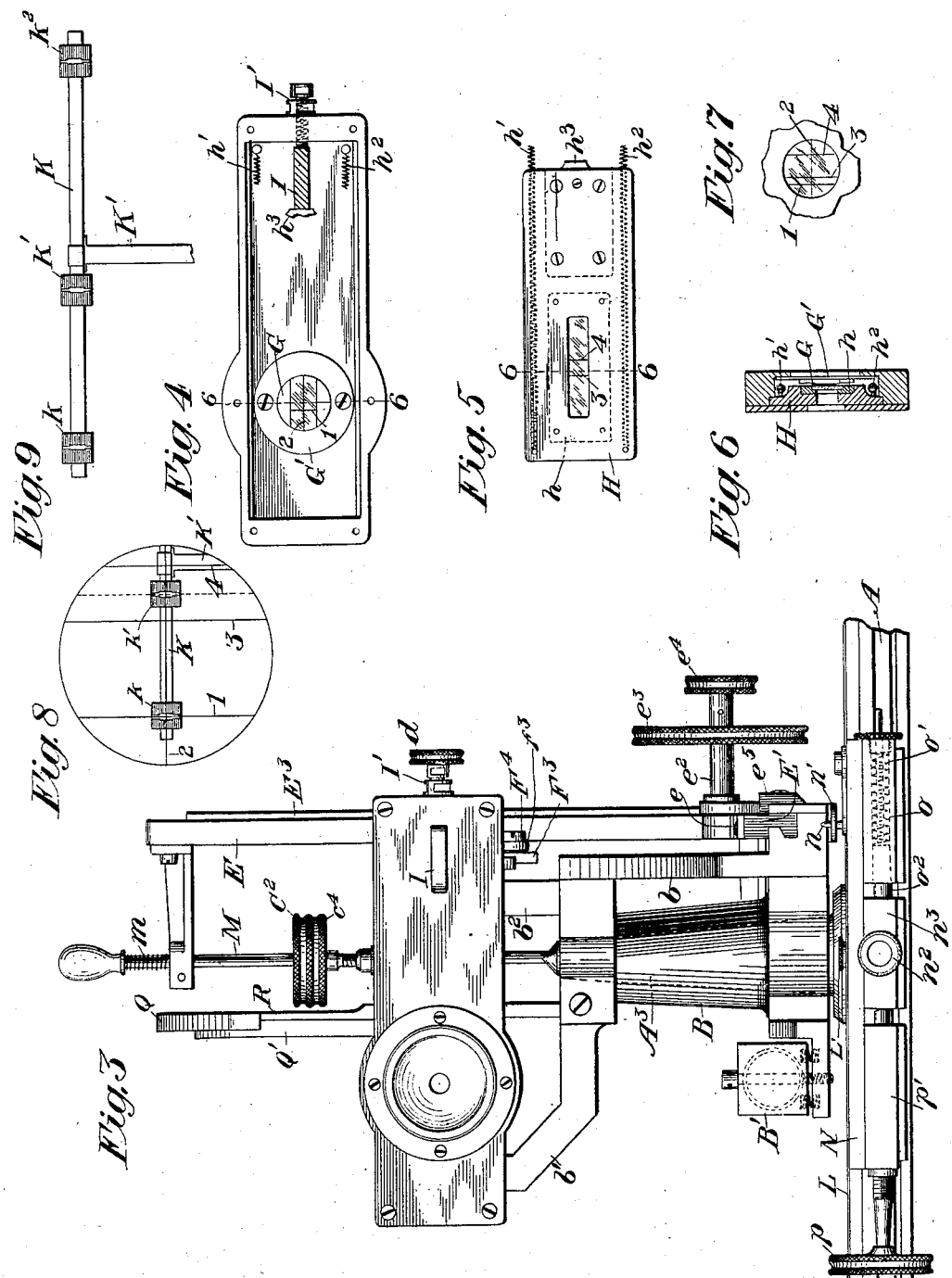

No. 735,829.

Patented August 11, 1903.

UNITED STATES PATENT OFFICE.

JEAN F. D. SCHRADER, OF PARIS, FRANCE.

MAPPING INSTRUMENT.

SPECIFICATION forming part of Letters Patent No. 735,829, dated August 11, 1903.

Application filed July 8, 1902. Serial No. 114,741. (No model.)

*To all whom it may concern:*

Be it known that I, JEAN FRANCOIS DANIEL SCHRADER, (generally called FRANZ SCHRADER,) a citizen of the Republic of France, and a resident of Paris, France, have invented an Improved Mapping Instrument, of which the following is a specification.

This invention relates to an instrument of the general character disclosed in my United States Patent No. 491,193, dated February 7, 1893, and embodies novel principles of construction and modes of operation hereinafter set forth in detail.

The accompanying drawings show the invention embodied in the form now best known to me and which experience has demonstrated to be practical, efficient, and accurate.

The details of construction may no doubt be varied by those skilled in such matters without departing from the principles of construction or the general mode of operation.

Figure 1:
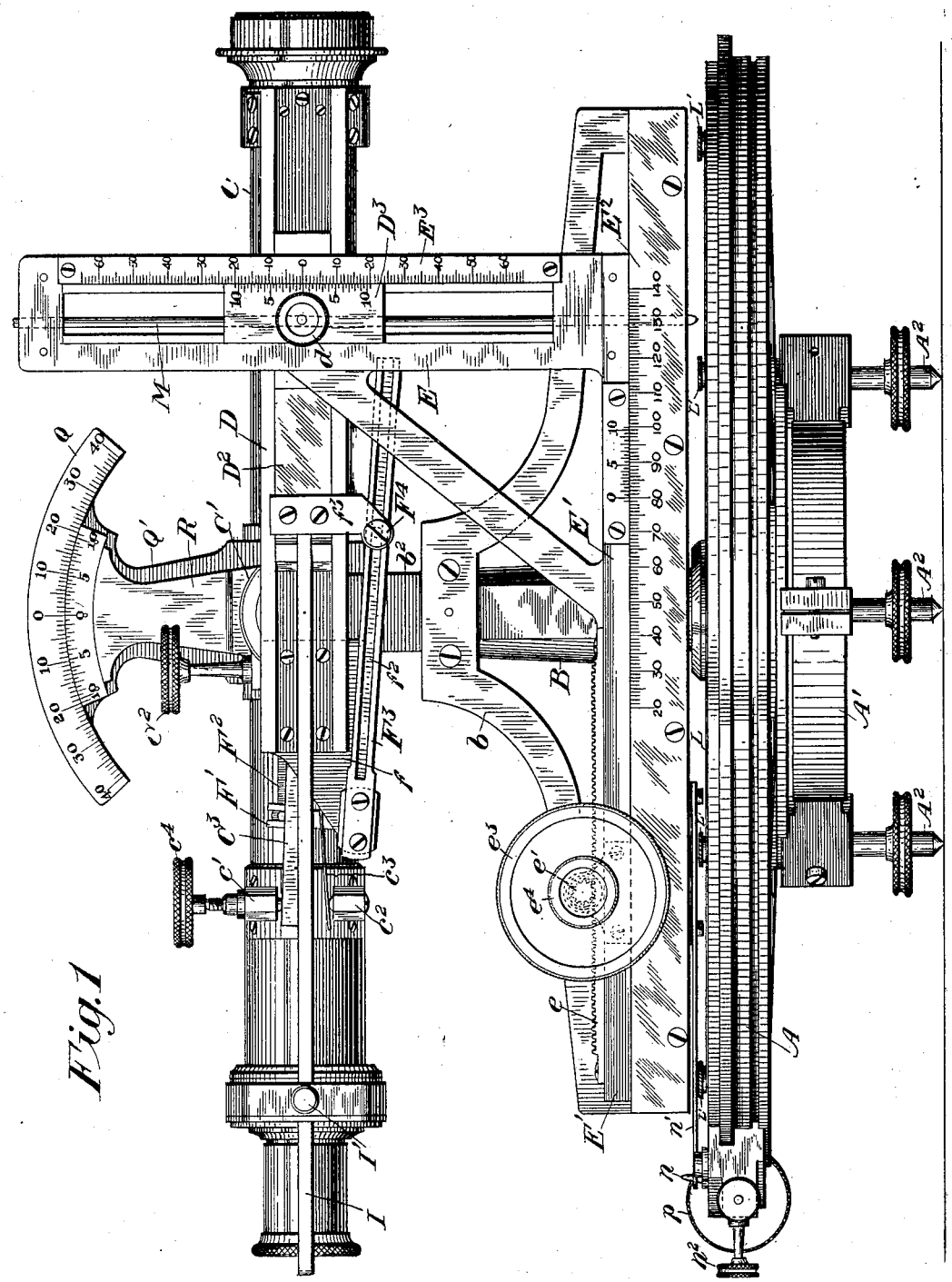
Figure 2:
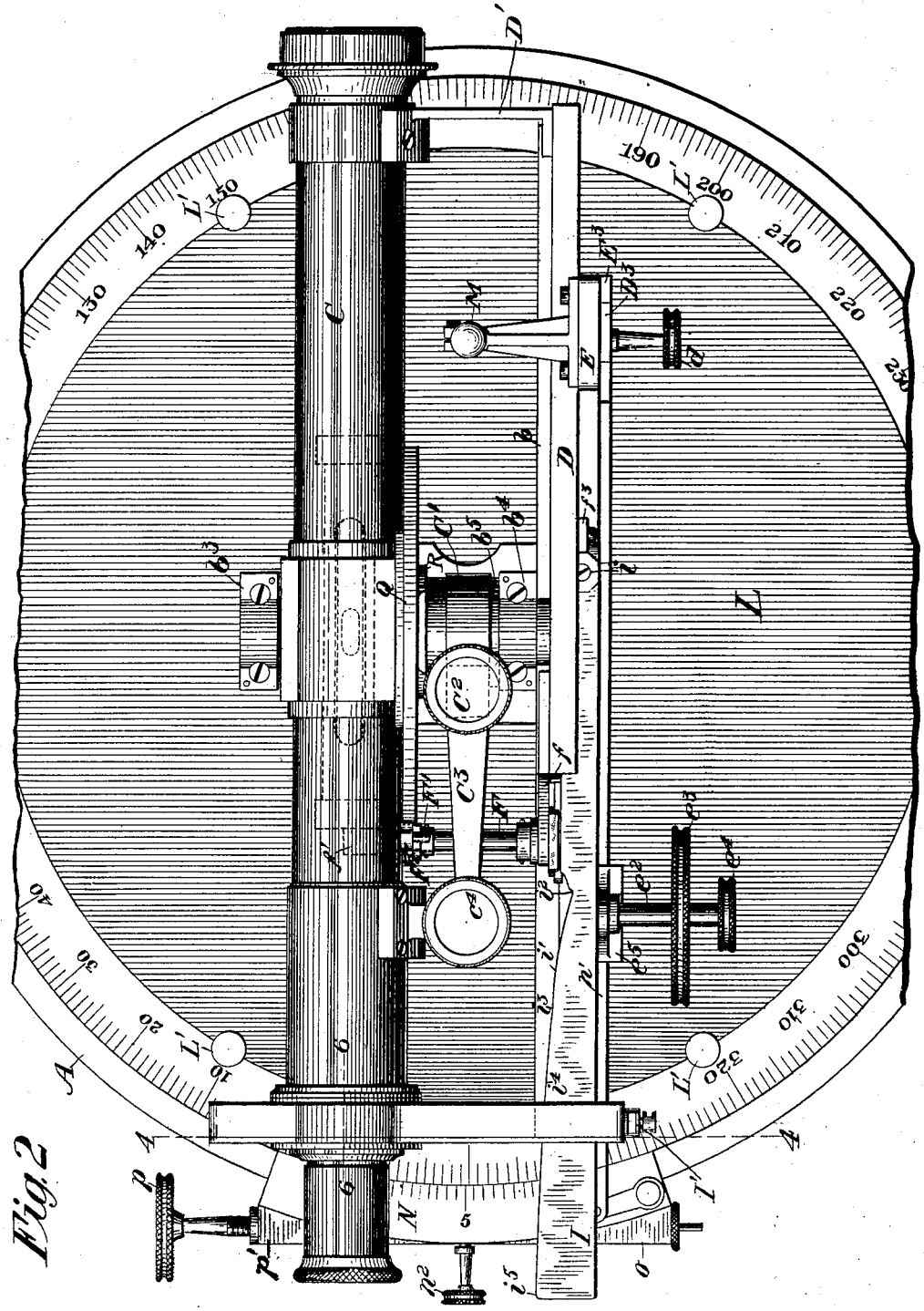

Figure 1 is a side elevation; Fig. 2, a plan view; Fig. 3, a front elevation; Fig. 4, a detail view taken at the line 4 4 of Fig. 2, showing vertical and horizontal fixed lines within the telescope and the casing in which moves a slide carrying two coöperating movable vertical lines; Fig. 5, a detail view of the slide removed from the casing, showing the glass upon which the vertical movable lines are placed; Fig. 6, a transverse vertical section through the casing and slide on the lines 6 6 of Figs. 2, 4, and 5. Fig. 7 indicates the vertical and horizontal lines within the telescope as viewed through the eyepiece; Fig. 8, a view as seen through the telescope, showing the lines and the distant targets in connection with which measurements are made. Fig. 9 shows the stadia or target device with which the instrument may be used.

In the construction illustrated the instrument comprises a circular base-plate A, which may be mounted upon an ordinary tripod, but which is shown as supported by an annular frame A', resting upon adjustable screw-posts $A^2$. A conical post $A^3$, rising from the center of the bed-plate, (dotted lines, Fig. 3,) rotatably supports a correspondingly-apertured hub B, carrying the telescope and associated parts. An ordinary spirit-level B' at one side of the hub affords a guide for adjustment of the base-plate to a true horizontal position.

Rigidly connected with the hub B is a frame comprising the side piece $b$, arranged at one side of, parallel with, and in a plane below the telescope, and the uprights $b'$ $b^2$, in the upper ends of which are the horizontal bearings $b^3$ $b^4$ for the trunnions upon which the telescope C rocks vertically. On the inner face of the standard carrying the bearing $b^4$ is a circular projection $b^5$, embraced by a split-ring clamp C', controlled by a screw provided with a thumb-piece $C^2$ for holding the telescope in any adjusted position, and from the clamp extends forward an arm $C^3$, the end of which lies between lugs $c'$ $c^2$, forming part of a bracket attached to the side of the telescope. A stiff spring $c^3$, applied to the under side of this arm and bearing on the lug $c^2$, forces the arm toward the lug $c'$, in which is fitted an adjusting-screw provided with a thumb-piece $c^4$. After the angular position of the telescope is roughly fixed by the clamp C' a finer adjustment is effected by manipulation of the thumb-piece $c^4$.

Mounted rigidly with the telescope, parallel therewith and in the same horizontal plane, is a grooved way or guide-plate D, fast to one of the trunnions of the telescope and connected at its outer end with the telescope by the cross-piece D', and in it slides a plate $D^2$, having pivoted to its forward end a block $D^3$, fitting and traveling in a vertical slot in the member E, forming part of a right-angular frame, the horizontal member E' of which slides in ways in the lower part of the side piece $b$ of the frame, carried by the hub B. An angularly-cut rack $e$ on the part E' is engaged by a correspondingly-cut pinion $e'$ on the end of a short shaft $e^2$, provided with large and small thumb-wheels $e^3$ $e^4$ and mounted in a bracket $e^5$, bolted to the lower side of the part $b$ of the frame. On the side of the frame-piece $b$ is applied a scale $E^2$, while a coöperating vernier is attached to the horizontal member E' of the sliding right-angular frame, the vertical member of which carries a scale $E^3$, and to the block $D^3$ is applied a vernier. Obviously with the telescope in other than a horizontal position when the sliding frame E E' is moved the block $D^3$ will move up or down, its movement being proportional to the angle at which the telescope is set. Adjustment of the hereinafter-described indicating devices and focusing of the telescope are simultaneously effected.

A horizontal rock-shaft F, having bearings in a plate $f$, applied at the front end of the guide D, and in a lug $f'$ on the under face of the telescope, carries a radial arm F', having a forked end actuating a sliding plate $F^2$, connected through a slot in the outer wall of the telescope with the sliding sleeve carrying the adjustable lens. On the outer end of the rock-shaft is an elongated arm $F^3$, extending forwardly and downwardly and having in it a straight groove $f^2$, in which runs the point of a screw $F^4$, located in a horizontal plane below the axis of the rock-shaft F and carried by a small plate or bracket $f^3$, attached to the front end of the slide $D^2$. As the sliding frame E E', and with it the slide $D^2$, are moved by means of the rack and pinion $e\ e'$, the telescope will be focused by adjustment of the outer lens.

The indicating devices in the telescope are constructed and operated as follows: Between the body of the telescope and the removable eyepiece carrying the front lens is interposed a flat casing, arranged at right angles to the axis of the telescope. A glass plate G, placed across an opening in the casing, has thereon a vertical line 1 and a horizontal line 2. The glass may be conveniently rectangular and may be seated in a corresponding aperture in a ring G', secured by screws. A sliding frame H works within the casing and is formed with a horizontal elongated rectangular aperture, back of which is fitted a frame $h$, carrying a glass upon which are cut two vertical lines 3 4. Spiral springs $h'\ h^2$, the ends of which are connected, respectively, to the casing and to the slide H, tend normally to draw the latter to the right, as depicted in the drawings, and hold a projection $h^3$ thereon against the cam-face of a bar I, that travels in an aperture in the casing and the front end of which is hinged at $i$ to the front end of the slide $D^2$, traveling in the guide D. In the end wall of the casing is an adjusting-screw I', provided with a check-nut and working against the straight outer or back edge of the cam-bar. The cam-face may be thus adjusted in or out with reference to the axis of the telescope to thereby adjust the relation of the movable vertical lines 3 4 relatively to the focus of the telescope. Wires might be used, but the lined glass plates are preferred.

The indicating-marks 1 2 3 4 in the telescope are to be employed in connection with a stadia or target, which may be of the character indicated in Fig. 9 and comprises a cross-bar K, supported by a telescoping standard K' to afford vertical adjustment and carrying three marks or targets $k\ k'\ k^2$, arranged at known distances apart. The instrument being properly adjusted and the scales $E^2\ E^3$ being properly laid off, the operator, viewing the stadia through the telescope and taking notes of the targets $k\ k'$, may cause the fixed line 1 and the horizontal line 2 to intersect the center of the target $k$, as indicated in Fig. 8. Then by movement of the sliding right-angular frame E E' by means of the hand-wheel $e^3$ or $e^4$ the movable vertical line 3, carried in the slide H, may be brought into position to intersect the other target $k'$, being, for instance, thereby moved from the full-line position shown in Fig. 8 to the intersecting position indicated by the dotted line. The surface $i'$ of the cam, which extends between the points $i^2\ i^3$, Fig. 2, acts during the operation upon the slide H, and the focus of the telescope has been correspondingly adjusted in the manner described. This condition having been established, the length of the sight or distance of the targets will be shown by the scale $E^2$, while the vertical elevation above or depression below the plane of the horizontal axis of the telescope will be shown by the scale $E^3$. To make a record of the length of the sight or distance of the target from the operator, a circular disk L, concentric with the vertical axis of the instrument, is placed on the circular base-plate, being held in position by thumb-screws L', and a vertically-movable pencil or stylus M is mounted in brackets projecting from the inner face of the vertical member E of the sliding right-angular frame. The pencil or stylus is normally held up by a spiral spring $m$, and when depressed and rotated, if desired, a mark is made upon the circular sheet lying on the bed of the machine. This sheet may be thin metal, as zinc, and the stylus may be drill-pointed. The operator should now write opposite this mark upon the circular sheet the vertical elevation or depression of the target shown by the scale $E^3$ and may also write the distance as indicated by the scale $E^2$, or the latter may be determined later by the distance of the mark from the center of the sheet. When the distance of the target or stadia from the telescope is greater and accurate measurements may not so readily be made by means of the lines 1 2 3 and targets $k\ k'$, the operator may neglect the line 3 and when the fixed vertical line 1 intersects the target $k$ may by adjustment of the telescope move the vertical line 4 to intersect the target $k^2$. In this case, however, the targets being more distant the movement of the right-angular frame E E' for adjustment of the focus carries the section $i^4$ of the cam-bar included between the points $i^3$ and $i^5$ into engagement with the projection $h^3$ on the slide of the indicating devices.

The scales $E^2\ E^3$ and corresponding verniers are laid out metrically. Of course in taking the observations described and collecting the data the points of the compass are determined and indicated upon the sheet.

The peripheral part of the circular base-plate is divided by scale into three hundred and sixty degrees, by means of which the angular disposition of the telescope with reference to different observation-stations may be determined. In this regard the adjustment of the instrument may be effected as follows: Applied to the periphery of the base-plate is a segmental vernier N, and a vertical pin $n$ on a short link, pivoted to the top of the vernier at one end, is engaged by a projecting plate $n'$, attached to the under side of the end of the part $b$ of the frame. The vernier is rabbeted to slide on the edge of the plate and may be adjustably clamped thereon by the thumb-screw $n^2$, passing through a block $n^3$, located beneath the central part of the vernier and also rabbeted to slide upon the periphery of the base-plate. On each side of this block the vernier is formed with tubular hubs or bosses, in one of which, $o$, is contained a stiff spiral compression-spring $o'$, which forces a plunger $o^2$ against one end of the block $n^3$. A screw-bolt provided with a thumb-piece $p$, working in the other boss $p'$, bears against the opposite end of the block. When the vernier has been roughly adjusted by means of the block and thumb-screw $n^2$, a further finer adjustment may be effected by manipulation of the screw-bolt $p$, by means of which the vernier and frame of the telescope may be swung in either direction around the vertical axis of the instrument, the movement in one direction being afforded by a positive action of the screw $p$ and in the other by reaction of the spring $o'$.

For purposes of triangulation, either for checking accuracy of the described operations or otherwise, I provide a segmental scale Q on a vertical plate or post Q', carried by the telescope, and a coöperating vernier on a vertical post or plate R, secured to the frame attached to the rotatable hub B and through which one of the trunnions of the telescope passes.

By means of the clamp-nut $d$ the block $D^3$ may be clamped to lock the telescope and sliding frame E E'.

The characteristic features which I deem to be novel and of primary importance are: the operation of the cam directly upon the indicating devices, inaccuracies due to lost motion or springing of the parts being entirely suppressed; a means of direct adjustment of the cam; provision of two or more cam-surfaces merging one into the other to be respectively used according to the distance of the apparatus from the observation-point or stadia; the preferred construction of the cam in the form of a straight bar mounted parallel with the telescope and at the same level; simultaneous focusing of the telescope and adjustment of the indicating devices; the particular devices shown for effecting focusing of the telescope have been found efficient, but my invention is not limited to such details; the general arrangement by which the vertically-disposed micrometer is connected directly with the telescope through the medium of a slide at the level thereof, thereby making the instrument compact and certain in operation and suppressing inaccuracies due to lost motion, &c., and particularly the arrangement of a guide rigidly connected with the telescope and arranged at the level thereof and the slide carrying the vernier of the vertically-disposed horizontally-movable micrometer; the general arrangement of the telescope, guide, slide, and right-angular sliding frame having the two scales or micrometers.

The specific construction shown in Fig. 1, comprising a grooved arm carried by a rock-shaft and a pin traveling therein, has been heretofore proposed by Jules Carpentier, of Paris, for the focusing of a photographic camera, and I do not claim such detail *per se* as my invention.

I claim as my invention—

1. In an instrument of the general character described, the means for adjusting the indicating devices in the telescope comprising the slide of the indicating devices and a cam acting directly thereon.

2. In an instrument of the general character described, the means for adjusting the indicating devices in the telescope comprising the slide of the indicating devices, a cam acting directly thereon and means for adjusting the surface contact between the slide and cam toward and from the axis of the telescope.

3. In an instrument of the general character described, the combination of a telescope, the indicating devices therein comprising a slide movable perpendicularly to the telescope-axis and an endwise-movable cam-faced bar acting on the slide and arranged at the level of the telescope and substantially parallel thereto.

4. In an apparatus of the general character described, the combination of a telescope having indicating devices with two horizontally-movable lines and a cam having two operating cam-faces each of which is adapted to move said lines for the purpose set forth.

5. In an instrument of the general character described, the combination with the telescope having indicating devices therein, adapted by adjustment to be brought into desired visual relation to the targets of a distant stadia, of means for at one operation simultaneously adjusting said devices and correspondingly focusing the telescope.

6. In an instrument of the general character described, the combination of the telescope, indicating devices therein comprising a slide movable transversely to the axis of the telescope, a slide mounted at the level of the telescope and movable parallel therewith, and a cam-bar acting upon the transversely-movable slide and attached to the second-named slide.

7. In an instrument of the general character described, the combination of the telescope, indicating devices therein comprising a slide movable transversely to the axis of the telescope, a slide mounted at the level of the telescope and movable parallel therewith, a cam-bar acting upon the transversely-movable slide and attached to the second-named slide, and focusing devices operatively connected with said second-named slide whereby the telescope is focused and its indicating devices adjusted simultaneously.

8. In an instrument of the general character described, the combination of the telescope, indicating devices therein comprising a slide movable transversely to the axis of the telescope, a slide mounted at the level of the telescope and movable parallel therewith, a cam-bar acting upon the transversely-movable slide and hinged to the second-named slide, focusing devices operatively connected with said second-named slide whereby the telescope is focused and its indicating devices adjusted simultaneously and means for adjusting the surface contact between the cam-bar and the transversely-movable slide relatively to the axis of the telescope.

9. In an instrument of the general character described, the combination of a telescope having indicating devices therein, adapted by adjustment to be brought into desired visual relation to the targets of a distant stadia, means for at one operation simultaneously adjusting the indicating devices and focusing the telescope and a scale showing the horizontal distance of the stadia then viewed by the operator.

10. In an instrument of the general character described, the combination of a telescope mounted to rock about a horizontal axis, indicating devices therein, means for simultaneously adjusting the indicating devices and focusing the telescope, two scales, one showing the horizontal distance of the object viewed by the operator and the other its vertical elevation or depression relatively to the elevation at which the instrument is placed.

11. In an instrument of the general character described, the combination of a telescope rocking about a horizontal axis and having indicating devices therein, a part mounted to move parallel with the telescope, means connected therewith for adjusting the indicating devices and focusing the telescope, a right-angle frame sliding in a vertical plane parallel with the axis of the telescope, a scale applied to its vertical member, a piece pivoted to said slide movable in or on said vertical member and carrying a component part of the scale, a horizontal scale and a component part thereof carried by the horizontal member of the right-angle frame, for the purposes set forth.

12. In an instrument of the general character described, the combination of the telescope rocking about a horizontal axis, a slide at the level of the telescope mounted to move parallel therewith, a horizontally-movable vertical part carrying a scale and a piece pivoted to the slide, movable vertically in or on said vertical part and carrying a component part of the scale.

13. In an instrument of the general character described, the combination of a telescope having indicating devices and movable about a horizontal axis, a guide rigidly attached to the telescope and parallel therewith, a slide movable therein, a sliding right-angle frame applied to the vertical member thereof, a horizontal fixed scale, a component part thereof carried by the horizontal member of the right-angle frame, a piece pivoted to said slide movable in or on the vertical member of the right-angle frame and carrying a component part of the scale thereon.

14. In an instrument of the general character described, the combination of a base-plate adapted to hold a record-sheet, a vertical axis above the sheet, a telescope turning on said axis and rocking about a horizontal axis, indicating devices in the telescope, a scale showing the distance of the object viewed by the operator and a vertically-movable stylus normally out of contact with the disk but which on depression makes a mark at a point on the disk corresponding with the horizontal distance of the object.

15. In an instrument of the general character described, the combination of a base-plate adapted to hold a record-sheet, a vertical axis above the sheet, a telescope turning on such axis and rocking about a horizontal axis, indicating devices in the telescope, a scale showing the horizontal distance of the object viewed by the operator, a vertically-movable stylus normally out of contact with the disk but which on depression makes a mark at a point on the disk corresponding with the distance of the object and a scale showing the vertical elevation or depression of the object relatively to the elevation at which the instrument is placed.

16. In an instrument of the general character described, the combination of a telescope rocking about a horizontal axis; indicating devices therein; a rigid right-angle frame sliding in a vertical plane parallel with the axis of the telescope; a horizontal scale, a component part of which is on the horizontal arm of the sliding frame, indicating the horizontal distance of a viewed object; a vertical scale, a component part of which is on the vertical arm of the sliding frame, serving to indicate the elevation of said object relatively to that of the instrument; and a part actuated by vertical oscillation of the telescope and imparting sliding movement to said frame.

In testimony whereof I have hereunto subscribed my name.

JEAN F. D. SCHRADER.

Witnesses:
KATHARINE MACMAHAN,
EDWARD C. DAVIDSON.